(12) United States Patent
Wu et al.

(10) Patent No.: US 7,688,409 B2
(45) Date of Patent: Mar. 30, 2010

(54) TRANSFLECTIVE LCD USING MULTILAYER DIELECTRIC FILM TRANSFLECTOR

(75) Inventors: Shin-Tson Wu, Oviedo, FL (US);
Qiong-Hua Wang, Orlando, FL (US);
Thomas X. Wu, Oviedo, FL (US);
Xinyu Zhu, Orlando, FL (US); Zhibing Ge, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 670 days.

(21) Appl. No.: 11/635,718

(22) Filed: Dec. 7, 2006

(65) Prior Publication Data

US 2007/0103628 A1 May 10, 2007

(51) Int. Cl.
*G02F 1/1335* (2006.01)
*G02F 1/1337* (2006.01)
*G02F 1/1343* (2006.01)

(52) U.S. Cl. .............. 349/114; 349/113; 349/107; 349/117; 349/119; 349/130; 349/139

(58) Field of Classification Search ............. 349/113, 349/114, 119, 107, 117, 130, 139
See application file for complete search history.

(56) References Cited

U.S. PATENT DOCUMENTS

| 4,093,356 | A | 6/1978 | Bigelow et al. ............. 350/338 |
| 5,710,609 | A | 1/1998 | Shimada .................... 349/126 |
| 6,124,971 | A | 9/2000 | Ouderkirk et al. ........... 359/487 |
| 6,281,952 | B1 | 8/2001 | Okamoto et al. ............. 349/12 |
| 6,295,109 | B1 | 9/2001 | Kubo et al. ................. 349/119 |
| 6,330,047 | B1 | 12/2001 | Kubo et al. ................. 449/147 |
| 6,341,002 | B1 | 1/2002 | Shimizu et al. ............. 349/119 |
| 6,580,634 | B2 | 6/2003 | Fuchikami et al. .......... 365/145 |
| 6,633,353 | B1 | 10/2003 | Seki et al. ................... 349/113 |
| 6,674,496 | B2 * | 1/2004 | Wei .............................. 349/63 |
| 6,686,977 | B2 * | 2/2004 | Smith et al. ................... 349/43 |

(Continued)

OTHER PUBLICATIONS

Seiji Fukushima, et al. "Ferroelectric liquid-crystal spatial light modulator achieving bipolar Image operation and cascadability," Applied Optics, vol. 31, No. 32, Nov. 10, 1992, pp. 6859-6868.

(Continued)

*Primary Examiner*—Julie Ngo
(74) *Attorney, Agent, or Firm*—Brian S. Steinberger; Phyllis K. Wood; Law Offices of Brian S. Steinberger, P.A.

(57) ABSTRACT

A novel transflective liquid crystal display (LCD) is provided with a multilayer dielectric film transflector. The dielectric transflector is composed of alternating high and low refractive index dielectric material layers deposited directly on the inner side of the LCD substrate to avoid parallax. The transmittance of the dielectric transflector can vary from approximately 5% to approximately 95% by simply adjusting the individual dielectric layer thickness and the arrangement of layers. The thickness of the 10-layer film is approximately 700 nm, which does not affect the voltage drop on the LC. Two structures of the dielectric film using different positions of the materials of construction are provided and demonstrated. Such a transflective LCD exhibits outstanding features, such as, robust dielectric film, single cell gap, no parallax, and a simple fabrication process.

19 Claims, 20 Drawing Sheets

U.S. PATENT DOCUMENTS

| | | | |
|---|---|---|---|
| 6,795,149 B2 | 9/2004 | Vogels et al. | 349/117 |
| 6,806,934 B2 | 10/2004 | Furuhashi et al. | 349/139 |
| 6,903,512 B2 | 6/2005 | Ohta et al. | 315/169.1 |
| 2004/0125275 A1* | 7/2004 | Kurasawa | 349/96 |

OTHER PUBLICATIONS

M.F. Schiekel, et al., *"Deformation of Nematic Liquid Crystals with Vertical Orientation in Electrical Fields,"* Applied Physics Letters, vol. 19, No. 10, Nov. 15, 1971, pp. 391-393.

* cited by examiner

US 7,688,409 B2

TRANSFLECTIVE LCD USING MULTILAYER DIELECTRIC FILM TRANSFLECTOR

This invention relates to transflective liquid crystal displays (LCD) with a single cell gap, and in particular to transflective LCDs using partial transmissive and partial reflective multilayer dielectric film as the transflector and method of manufacture.

BACKGROUND AND PRIOR ART

Integrating transmissive LCD's high contrast ratio and good color saturation and reflective LCD's low power consumption, transflective LCD is viewable at anytime and anywhere. Transflective LCD is an emerging display technology with wide application including mobile displays and communication displays, like mobile phone, barcode scanners, gaming, global positioning system (GPS)/navigation devices, personal data assistant (PDA), e-books, and the like.

A transflective LCD is disclosed in U.S. Pat. No. 6,281,952 B1 to Okamoto et al.; U.S. Pat. No. 6,295,109 B1 to Kubo et al.; U.S. Pat. No. 6,330,047 B1 to Kubo et al., using a split-pixel approach, i.e. each pixel is split into reflective (R) and transmissive (T) sub-pixels. Usually, the R and T area ratio is 4:1, in favor of reflective display mode in order to conserve power. The transmissive region with small area ratio is used for dark ambient surroundings only.

Two types of transflective LCDs have been developed: single cell gap 100 type as shown in FIG. 1 and double cell gap 200 type as shown in FIG. 2. In the single cell gap type, the cell gap 100 of the T-region is substantially equal to that of the R-region, which leads to the same response time in both T and R regions; however, their electro-optical curves cannot overlap well because light passes through the T-region once but through the R-region twice.

In the double cell gap approach, the cell gap 200 of the T-region and that of the R-region have approximately two times the difference so that the response time has approximately four times the difference between the R-region and the T-region. The split-pixel approach, regardless of whether single or double cell gap, has complicated structures and fabrication processes since each pixel is divided into R and T sub-pixels. Thus, the double cell gap LCD is more complicated than the single cell gap LCD.

In U.S. Pat. No. 6,124,971 to Ouderkirk et al., assigned to 3M Innovative Properties Company, a transflective structure is provided, using a reflective polarizing transflector, as shown in FIG. 3. The structure in FIG. 3 is a single cell gap 300 approach without split-pixel, thus, it is easy to fabricate. However, the transflector is located between the polarizer and backlight source, which results in parallax (double image) and deteriorates the resolution. In U.S. Pat. No. 4,093,356 to Bigelow, assigned to the General Electric Company, a transflective LCD with a metallic mirror 400 is described and shown in FIG. 4. The transflector is a half-silver metallic mirror, which is quite thin (~50 nm) so that it can crack easily. The transflective LCD designs provided by both the 3M inventors and the General Electric inventor suffer from parallax. Parallax is that double image with displacement that occurs when one views a display panel from an oblique angle. Thus, it is desirable to have a parallax-free, transflective LCD that is robust, easy and inexpensive to fabricate.

SUMMARY OF THE INVENTION

A primary objective of the invention is to provide a new transflective liquid crystal display using partial transmissive and partial reflective multilayer dielectric film as the transflector.

A secondary objective of the invention is to provide a new transflective liquid crystal display in which the multilayer dielectric film is stable compared to the metal film.

A third objective of the invention is to provide a new transflective liquid crystal display without parallax or double image, wherein the transflector is located on the inner side of the liquid crystal substrate.

A fourth objective of the invention is to provide a new single cell gap type of transflective liquid crystal display.

A fifth objective of the invention is to provide a new transflective liquid crystal display without a response time difference between the T-mode and the R-mode.

A sixth objective of the invention is to provide a new transflective liquid crystal display with simpler structure and fabrication process compared with split-pixel approaches, especially the double cell-gap approach.

Further objects and advantages of this invention will be apparent from the following detailed description of a presently preferred embodiment, which is illustrated schematically in the accompanying drawings.

DESCRIPTION OF THE PREFERRED EMBODIMENT

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The term "transflector" as used herein means partial reflection and partial transmission.

The term "broadband quarter-wave film" as used herein refers to the combination of a half-wave film and a quarter-wave film.

Figure 1:
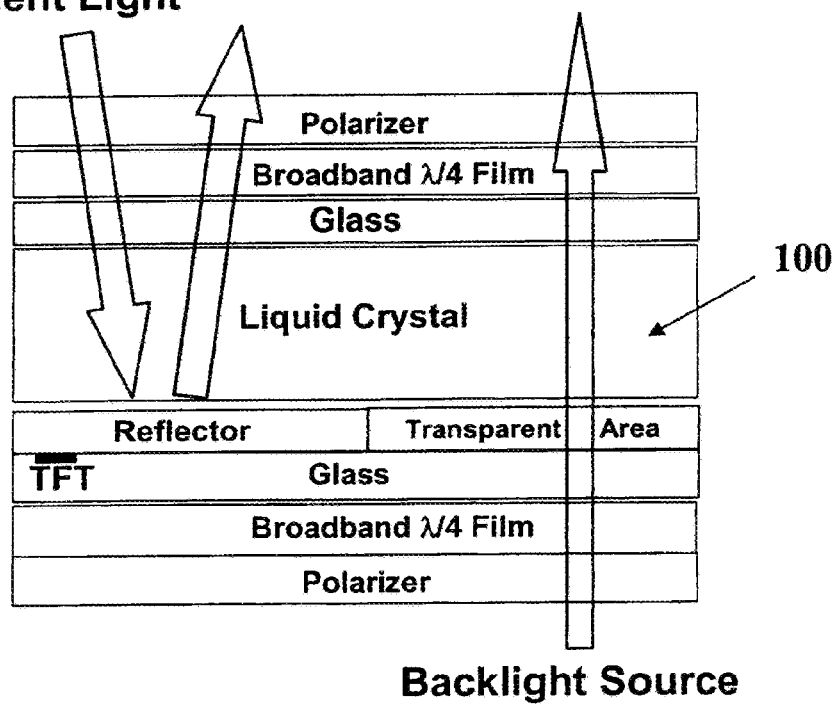
FIG. 1 shows a single cell gap type of transflective LCD with a split-pixel. (Prior Art)
Figure 2:
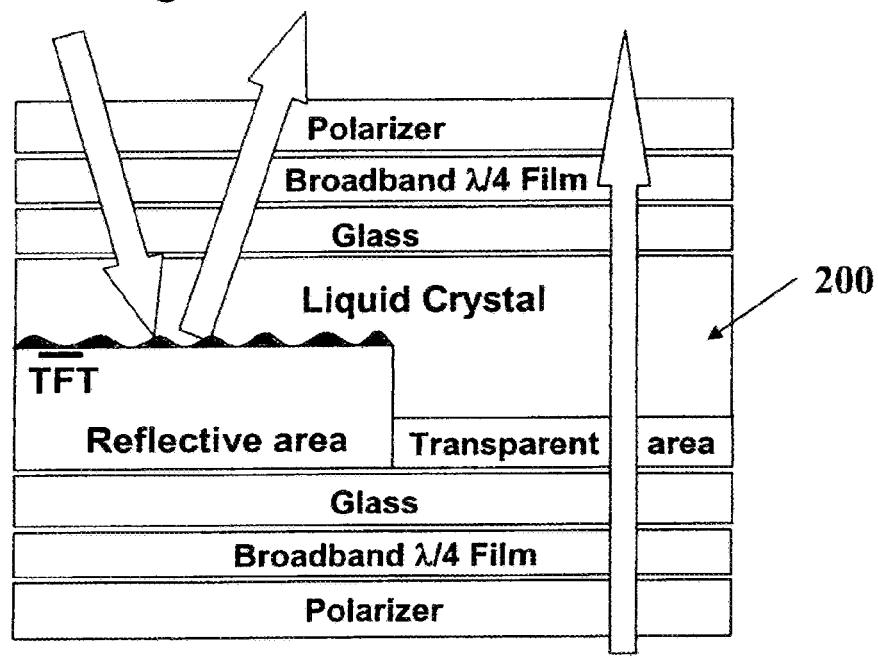
FIG. 2 shows a double cell gap type of transflective LCD with a split-pixel. (Prior Art)
Figure 3:
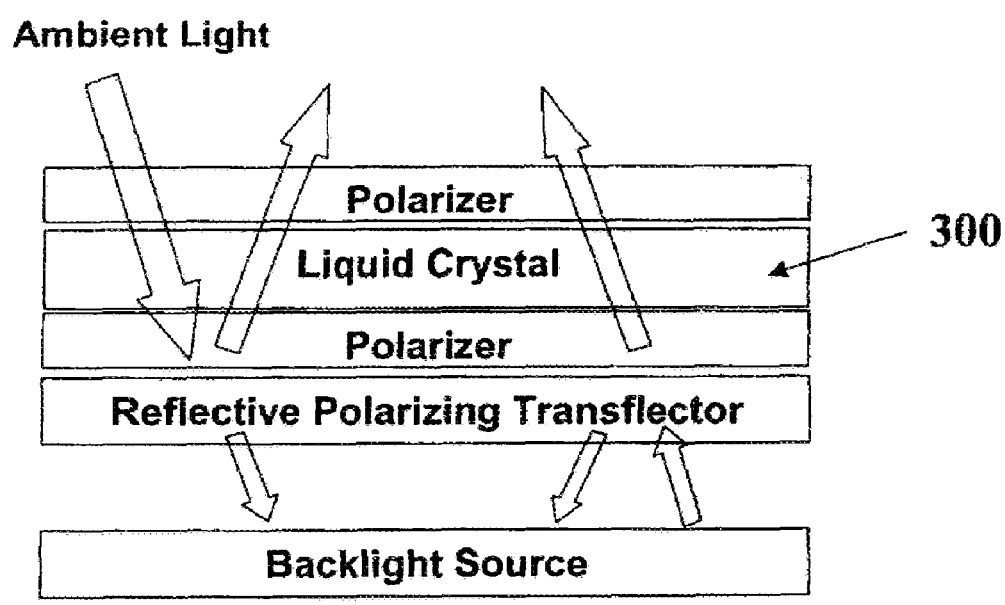
FIG. 3 shows a transflective LCD using a reflective polarizing transflector. (Prior Art)
Figure 4:
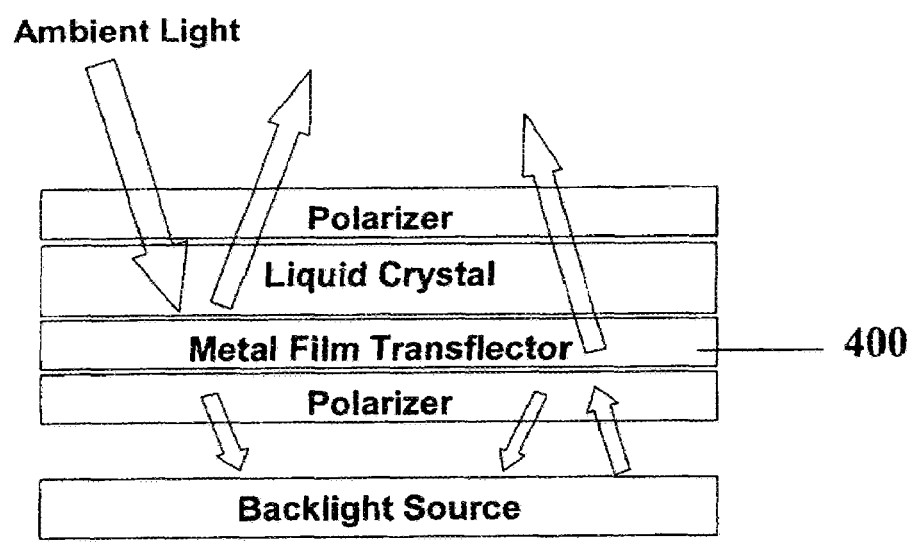
FIG. 4 shows a transflective LCD using a half-silver metallic mirror transflector. (Prior Art)
Figure 5:
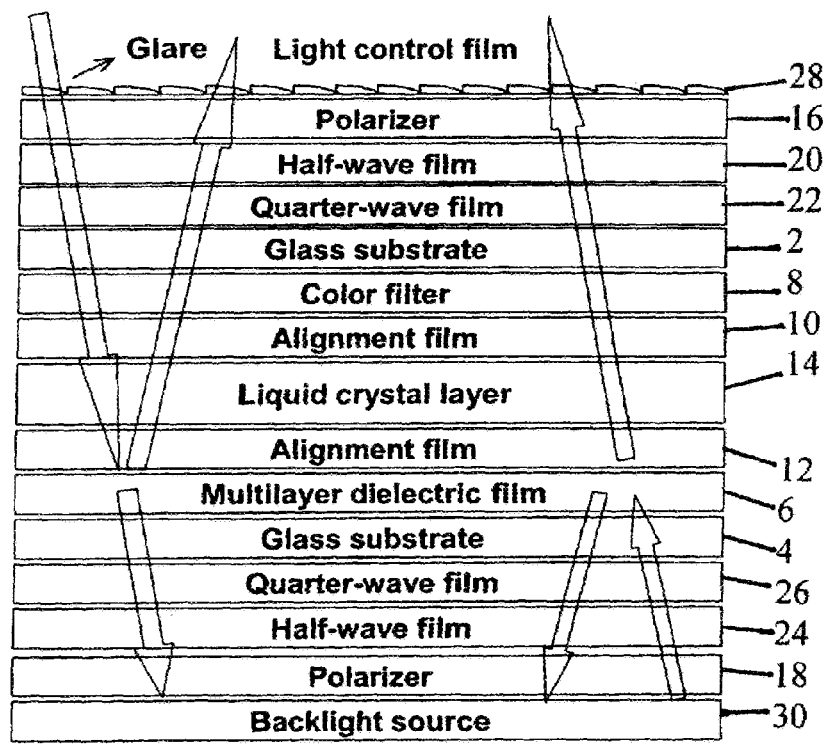
FIG. 5 shows the novel transflective LCD of the present invention using a partially transmissive and partially reflective multilayer dielectric film as the transflector.

As shown in FIG. 5, the present invention provides a novel single cell gap transflective liquid crystal display with a partially transmissive and partially reflective multilayer dielectric film as the transflector.

The basic components of the transflective liquid crystal display device of the present invention include a backlight source, at least one indium-tin-oxide (ITO) electrode layer, a pair of polarizer layers, a pair of transparent substrates, such as glass or plastic, with at least two half-wave films and at least two quarter-wave retardation films placed between the pair of polarizers and the transparent substrates, and sandwiched between the transparent substrates is a single cell gap liquid crystal layer adjacent to a multilayer dielectric transflector.

FIG. 5 provides greater detail on the structure of the transflective LCD of the present invention. The structure includes a first transparent substrate 2, such as glass or plastic, and a second transparent substrate 4, such as glass or plastic and a dielectric film transflector layer 6 with a transparent indium-tin-oxide (ITO) electrode layer (not shown) deposited on the second transparent substrate 4. Below the first substrate 2 is a color filter layer 8, which is used to produce a full color image. A first alignment film 10 is coated below the color filter 8 to produce a first liquid crystal alignment direction and a second alignment film 12 is coated above the dielectric film transflector layer 6 to produce a second liquid crystal alignment direction. Sandwiched between the first alignment film 10 and the second alignment film 12 is a liquid crystal layer 14. A first polarizer 16 is placed above the first transparent substrate 2 and a second polarizer 18 is placed below the second transparent substrate 4. At least a first half-wave film 20 and at least a first quarter-wave film 22 are sandwiched between the first polarizer 16 and the first transparent substrate 2. At least a second half-wave film 24 and at least a second quarter-wave film 26 are sandwiched between the second polarizer 18 and the second transparent substrate 4. Positioned below the second polarizer layer 18 is a backlight source 30. A light control film 28 is used on top of the first polarizer layer 16 to control glare.

Figure 7A:
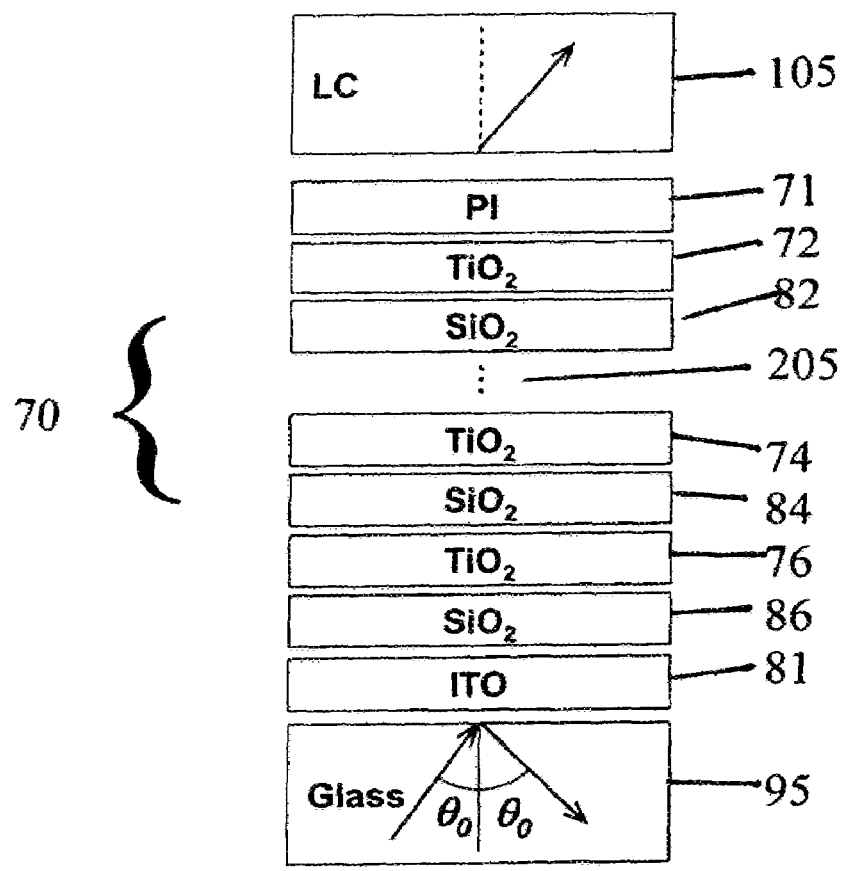
FIG. 7a is the structure of the first embodiment of a multilayer dielectric film of the present invention.
Figure 17:
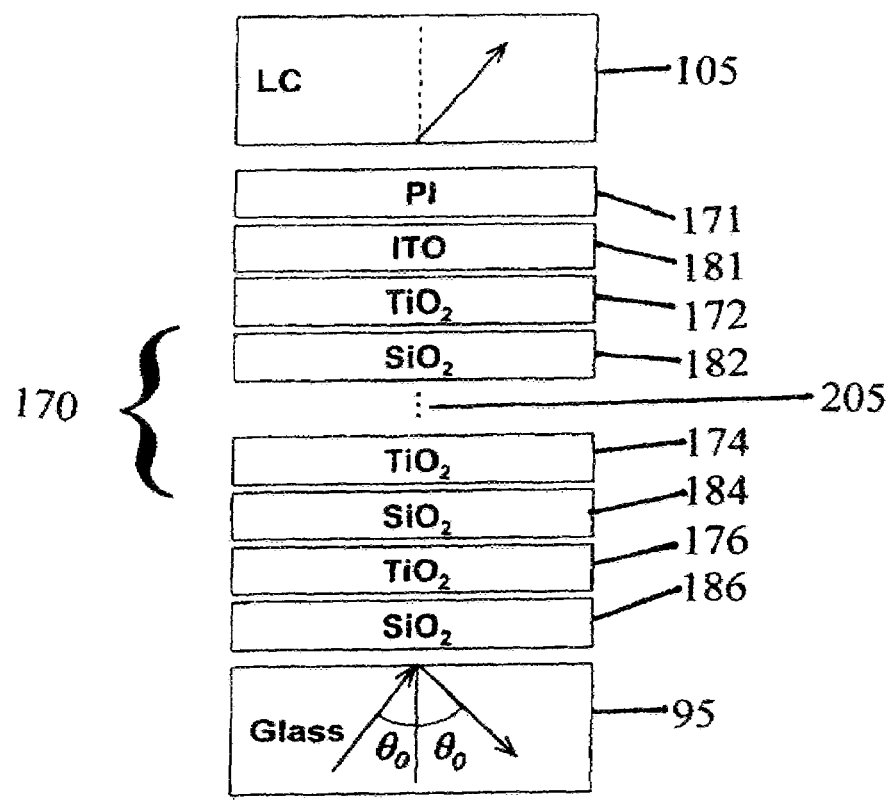
FIG. 17 is the structure of the second embodiment of a multilayer dielectric film structure of the present invention.

The partially reflective, partially transmissive, multilayer dielectric film is also referred to herein as, "dielectric transflector." Such a multilayer dielectric film can be deposited directly onto the liquid crystal substrate. Two embodiments of the dielectric transflector are shown in FIGS. 7a and 17 and described in detail below. It is readily understood by those skilled in the art that the invention can encompass many other embodiments, including many layers and arrangements of layers and is not limited to the two embodiments shown.

Figure 6A:
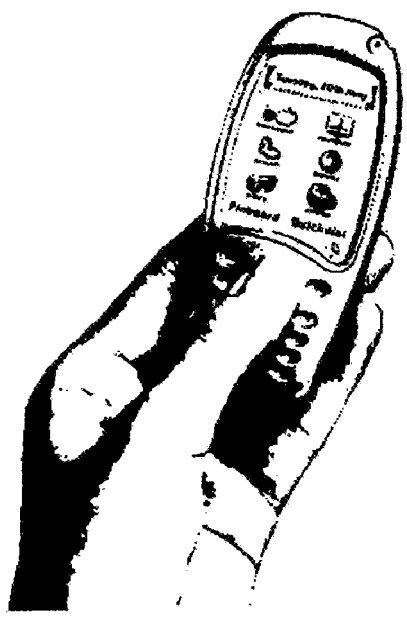
FIG. 6a shows a typical transflective LCD of a hand-held device operated at an oblique incident angle under ambient light.
Figure 6B:
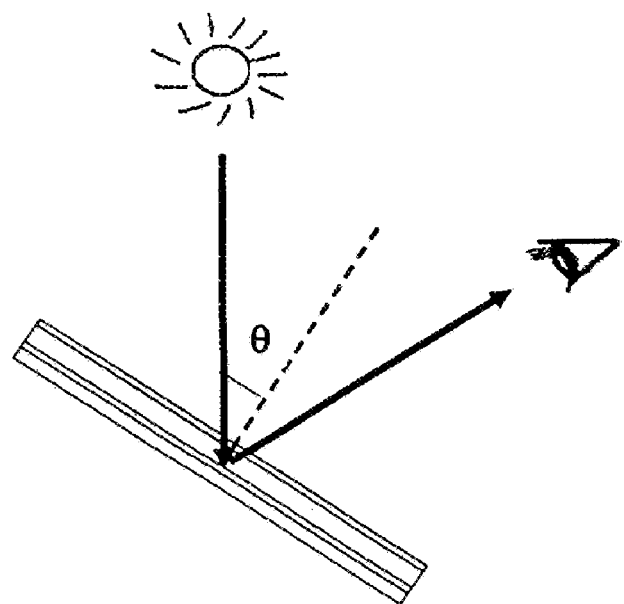
FIG. 6b shows the screen of a hand-held device at an oblique incident angle under ambient light.

FIGS. 6a and 6b show the transflective LCD in the reflective mode wherein the light source and the viewer are on the same side of the LCD panel. In order for the viewer to see the reflected light from the display, the ambient light source always enters the LCD panel at an oblique angle. In FIG. 6b, the ambient light impinges on the display at ~30° angle. FIGS. 6a and 6b illustrate the transflective LCD that requires the transflector to be insensitive to the light incident angle. The insensitivity property of the transflector ensures a good image quality over a wide viewing cone.

FIG. 7a shows the structure of the first embodiment of a dielectric transflector 70 of the present invention. The multilayer dielectric transflector is positioned below the liquid crystal layer 105 and is composed of alternating high refractive index material such as titanium oxide ($TiO_2$) layers 72, 74, 76 and low refractive index material such as silicon dioxide ($SiO_2$) layers 82, 84, 86. The vertical ellipsis 205 is used to show that the alternating layers are not limited to those layers shown. A person skilled in the art will readily understand that alternating layers can be increased or decreased to obtain the desired quality of reflection and transmission for the LCD. The transflector is sandwiched between polyimide (PI) layer 71 and indium-tin-oxide (ITO) layer 81, which is deposited on glass or plastic substrate 95, as shown in FIG. 7a. Listed in Table 1 are the materials' refractive indexes and ITO and PI film thickness for the dielectric transflector structure 70 shown in FIG. 7a. And since it is the product of thickness and refractive index value that counts for optical phase retardation, only the variations of index value are listed for the ITO and PI layers. The values shown are used to calculate the transflector's transmittance and reflectance by optimizing the film's thickness and the number of layers.

TABLE 1

The Refractive Index and Thickness of Dielectric Layers, ITO and PI

| Materials | Refractive index (n) | Thickness d (nm) |
|---|---|---|
| Glass | 1.5-1.6 | |
| ITO | 1.90-2.10 | 50 |
| SiO$_2$ | 1.40-1.50 | |
| TiO$_2$ | 2.30-2.50 | |
| PI | 1.50-1.70 | 100 |
| LC | 1.5-1.6 | |

Figure 7B:
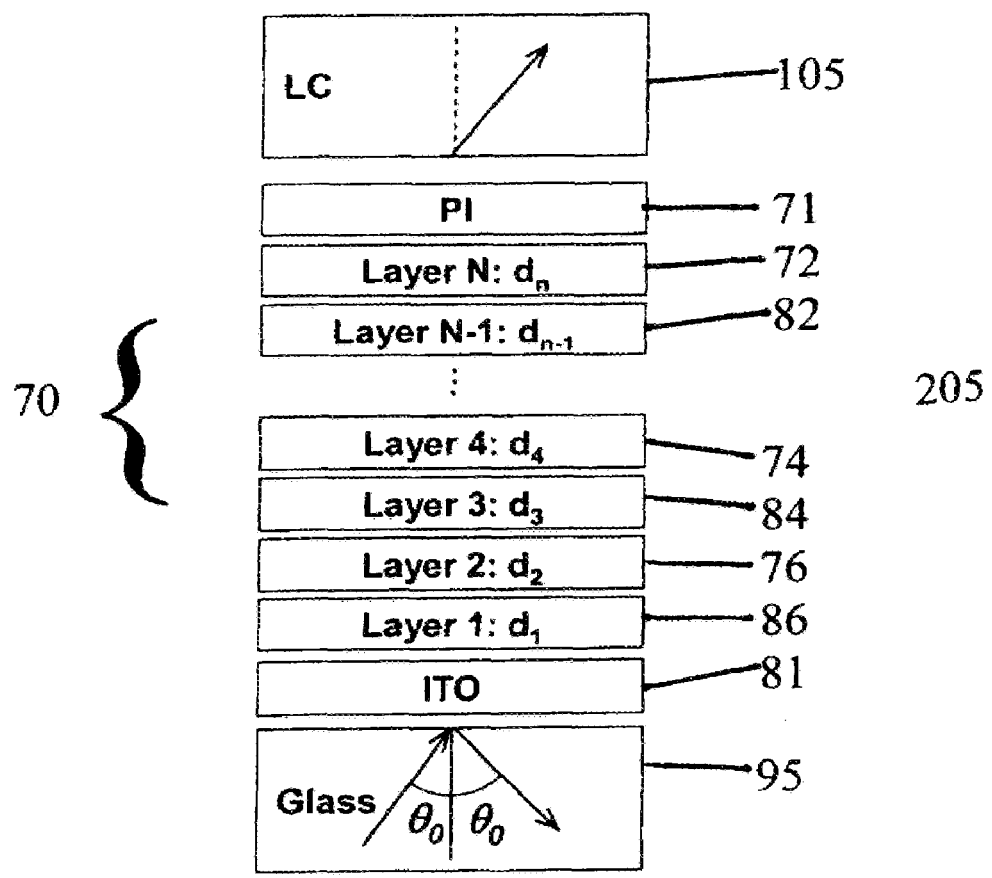
FIG. 7b shows the layered structure used for simulations.

In the multilayer dielectric film 70, as shown in FIG. 7b, the polyimide (PI) layer 71 is positioned below the liquid crystal layer 105 and above alternating layers of high refractive index material, such as, titanium dioxide (TiO$_2$) 72, 74, 76 and low refractive index material, such as, silicon dioxide (SiO$_2$) 82, 84, 86, with a bottom layer of ITO 81. The vertical ellipsis 205 indicates that the number of alternating layers can be varied as needed or desired. According to electro-magnetic theory for any k-layer-stack film, the overall reflectance is the average of p-component light reflectance and s-component light reflectance, as expressed in Equation 1.

$$R = \frac{R_p + R_s}{2}.  \quad 1.$$

$R_p$ and $R_s$ are the reflectance of p-component and s-component, respectively. Here $R_p$ and $R_s$ can be obtained from equation 2:

$$R_{p,s} = \left(\frac{\eta_0 B - C}{\eta_0 B + C}\right)\left(\overline{\frac{\eta_0 B - C}{\eta_0 B + C}}\right). \quad 2.$$

where $$\begin{bmatrix} B \\ C \end{bmatrix} = \left\{\prod_{i=1}^{k} \begin{bmatrix} \cos\delta_i & j\frac{\sin\delta_i}{\eta_i} \\ j\eta_i \sin\delta_i & \cos\delta_i \end{bmatrix}\right\}\begin{bmatrix} 1 \\ \eta_{k+1} \end{bmatrix}$$

$$\delta_i = \frac{2\pi}{\lambda} n_i d_i \cos\theta_i$$

$\eta_i = n_i / \cos\theta_i$ (For p-component)

$\eta_i = n_i \cos\theta_i$ (For s-component)

$$\theta_i = \sin^{-1}\left(\frac{\sin\theta}{n_i}\right)$$

Here $n_i$, $d_i$ and $\theta_i$ are the refractive index, thickness and refractive angle of the $i^{th}$ layer, respectively. $\eta_0$ and $\eta_{k+1}$ mean the admittance of the glass substrate and the liquid crystal layer, respectively. $\theta$ means the incident angle in the air or free space. The overall transmittance of the multilayer film is then expressed in equation 3:

$$T = 1 - R \quad 3.$$

From equations 1-3, it is easy to see that the transmittance is a function of both wavelength and incident angle of light. We express it as $T(\lambda, \theta)$. To get the optimal thickness in each layer $d_i$, it is necessary to minimize the cost function in equation 4:

$$\text{Cost} = \int_{400\,nm}^{700\,nm} |T(\lambda, \theta) - T| d\lambda \quad 4.$$

where T is the targeted transmittance value.

Three types of films with different transmittance T=30% (R=70%), T=50% (R=50%), and T=70% (R=30%) are designed as examples of the transflector of the present invention. The optimal film thickness data for the dielectric transflector 70 are listed in Table 2.

TABLE 2

Optimal Thickness of the SiO$_2$ (odd) and TiO$_2$ (even) Layers of 1st Embodiment

| Layer number | Thickness (nm) | | |
|---|---|---|---|
| | Transmittance T = 30% | Transmittance T = 50% | Transmittance T = 70% |
| 1 | 50-60 | 25-35 | 16-26 |
| 2 | 40-50 | 48-58 | 25-35 |
| 3 | 66-76 | 62-72 | 27-37 |
| 4 | 47-57 | 29-39 | 62-72 |
| 5 | 86-96 | 36-46 | 113-123 |
| 6 | 64-74 | 80-90 | 38-48 |
| 7 | 116-126 | 72-82 | 18-28 |
| 8 | 70-80 | 82-92 | 35-45 |
| 9 | 169-179 | 45-55 | |
| 10 | 5-15 | 92-102 | |
| Number of layer | 10 | 10 | 8 |
| Total thickness(nm) | 713-813 | 571-671 | 334-414 |

Figure 8:
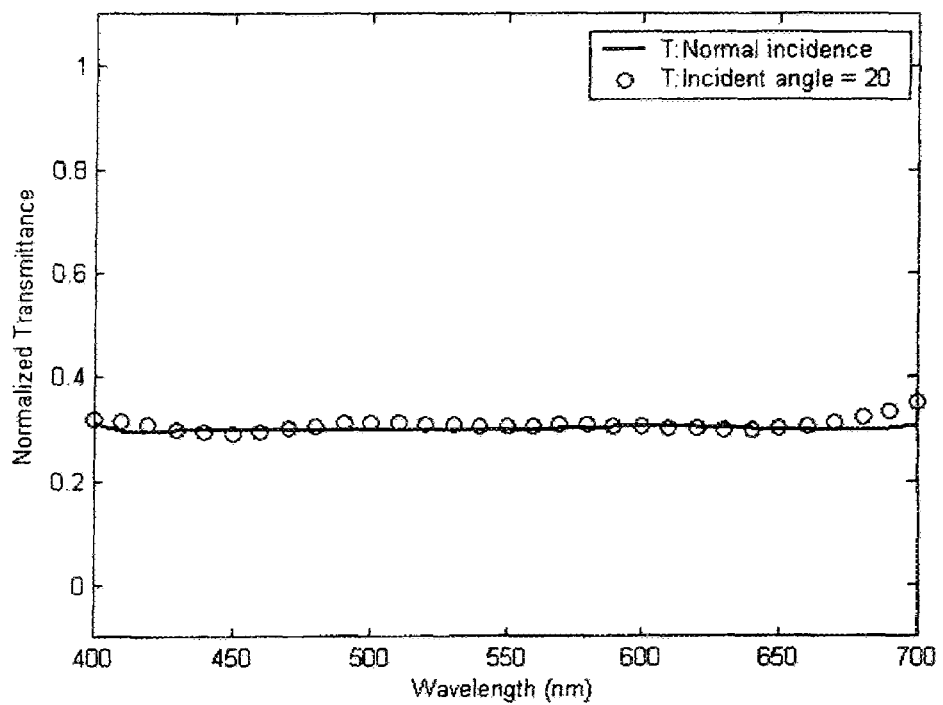
FIG. 8 shows the wavelength-dependent transmittance of T=30% dielectric films in the first embodiment (FIG. 7a) at normal and 20° incident angles.
Figure 9:
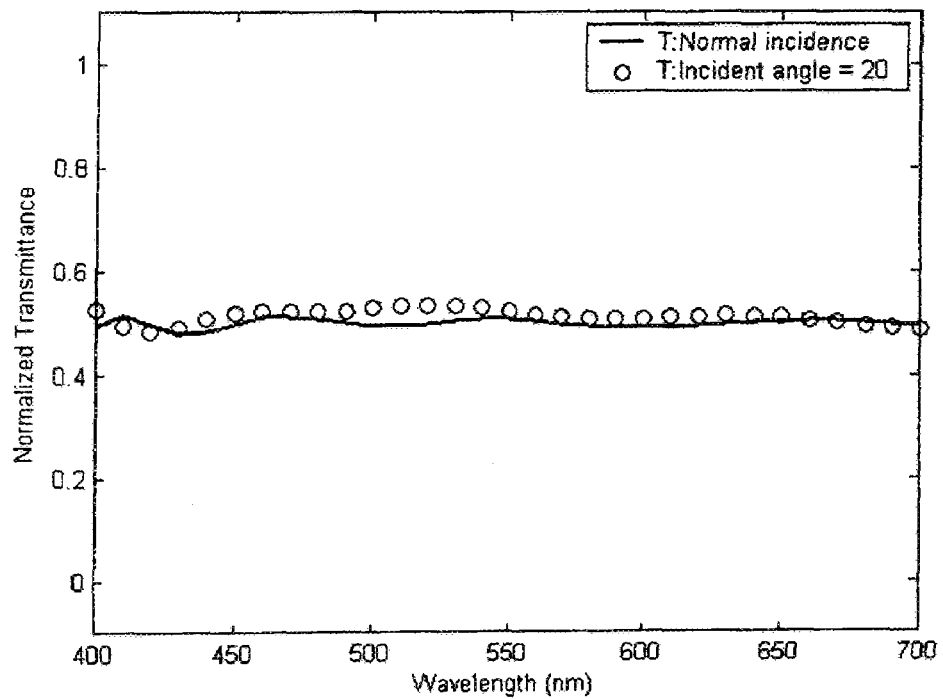
FIG. 9 shows the wavelength-dependent transmittance of T=50% dielectric films in the first embodiment (FIG. 7a) at normal and 20° incident angles.
Figure 10:
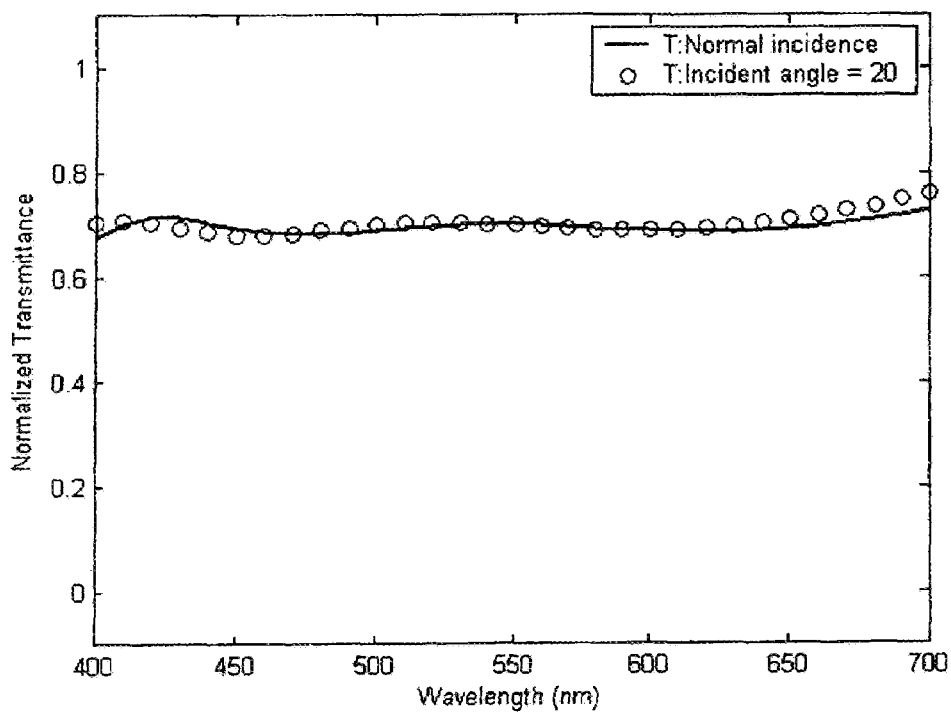
FIG. 10 shows the wavelength-dependent transmittance of T=70% dielectric films in the first embodiment (FIG. 7a) at normal and 20° incident angles.

FIGS. 8, 9 and 10 show the wavelength dependent transmittance curves for three different transmittance multilayer dielectric transflectors in the first embodiment: T=30%, T=50% and T=70%. From these figures, we can see that the transmittance is quite insensitive to the wavelength from 400 nanometers (nm) to 700 nm. In addition, the transmittance is also insensitive to the incident angles up to around 30° in the air and refractive angle around 20° in the glass. The wavelength insensitivity property ensures high light efficiency in the whole visible light range and good color reproduction of image displayed from the panel. The wide acceptance angle of the multilayer transflector also benefits the image quality over a large viewing angle. FIG. 8 shows transmittance of T=30%; FIG. 9 shows transmittance of T=50% and FIG. 10 shows transmittance of T=70%.

Figure 11:
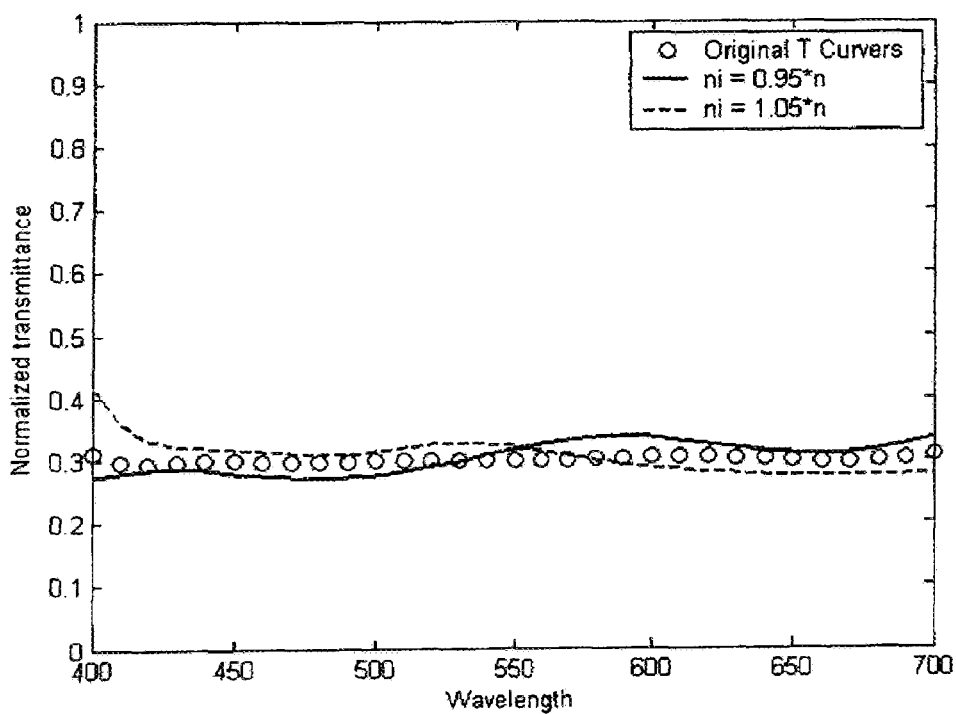
FIG. 11 shows the material refractive index tolerance analysis of the T=30% dielectric transflector in the first embodiment (FIG. 7a).
Figure 12:
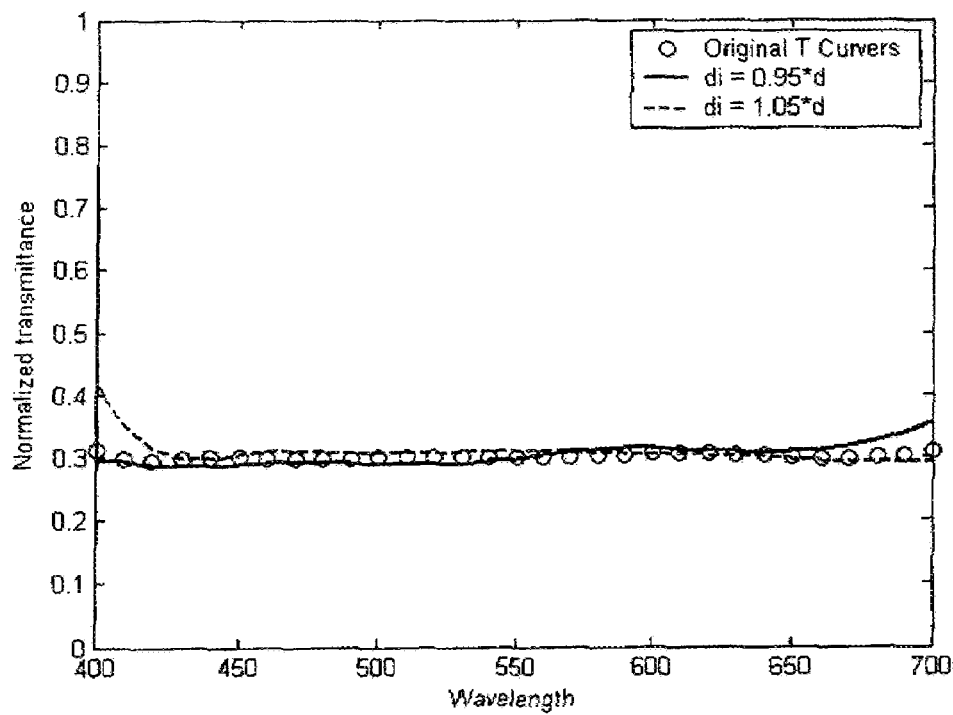
FIG. 12 shows the film thickness tolerance analysis of the T=30% dielectric transflector in the first embodiment (FIG. 7a).
Figure 13:
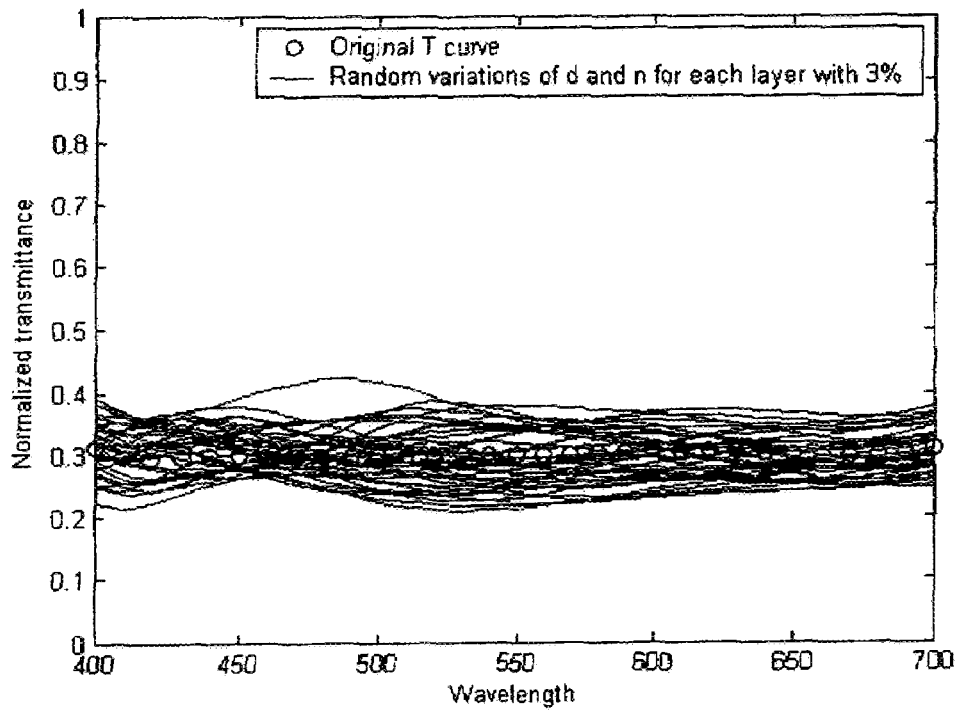
FIG. 13 shows the layer thickness and material refractive index tolerance analysis of the T=30% dielectric transflector in the first embodiment (FIG. 7a) with random variations for layer thickness and refractive index.

Considering the possible error in practical fabrication processes, tolerance analysis of each parameter is necessary. The following procedure is used for tolerance analysis: First, one of the two parameters (n=refractive index and d=thickness) is changed while keeping the other parameters fixed. Next, all the parameters are randomly changed. The calculated results of the dielectric transflector 70 are shown in FIGS. 11, 12, 13 for a T=30% multilayer transflector, in the first embodiment. FIG. 11 shows the material refractive index (n) tolerance.

Figure 14:
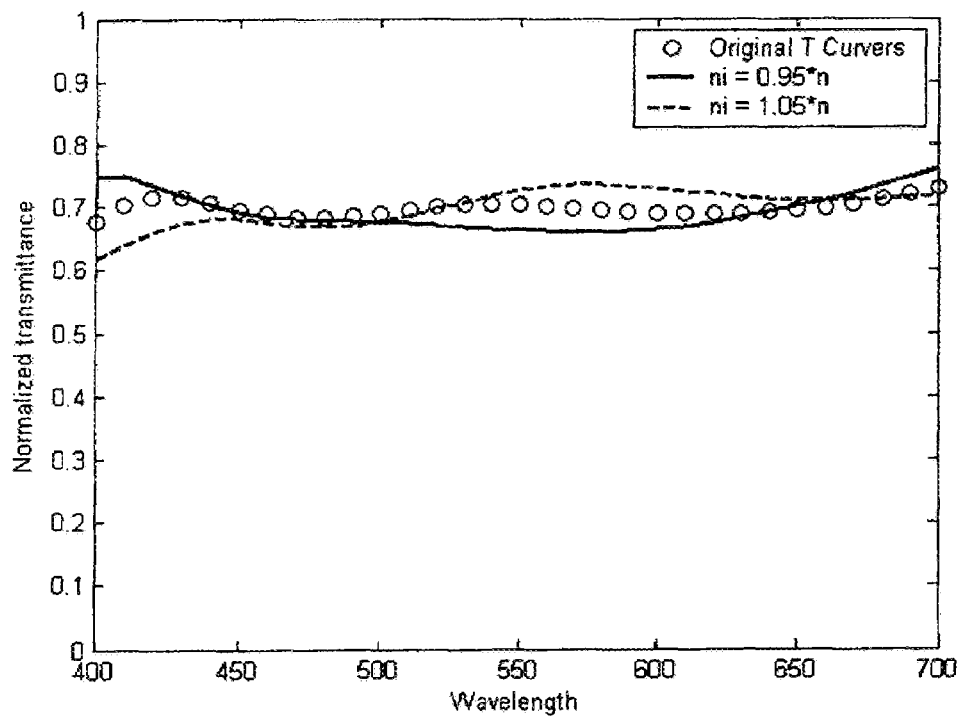
FIG. 14 shows the material refractive index tolerance analysis of the T=70% dielectric transflector in the first embodiment (FIG. 7a).
Figure 15:
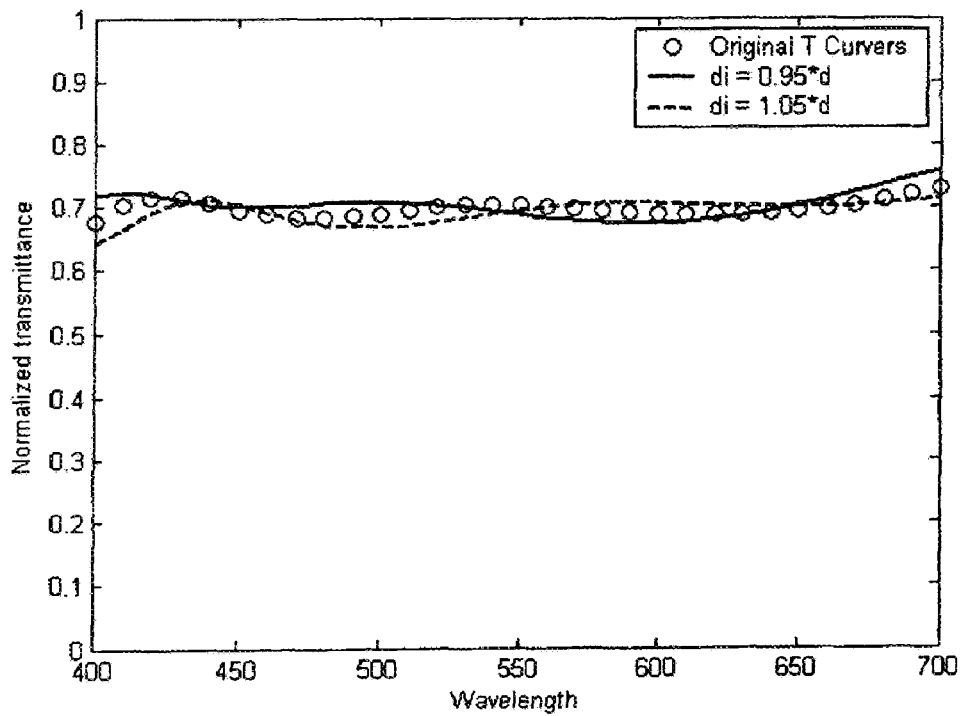
FIG. 15 shows the film thickness tolerance analysis of the T=70% dielectric transflector in the first embodiment (FIG. 7a).
Figure 16:
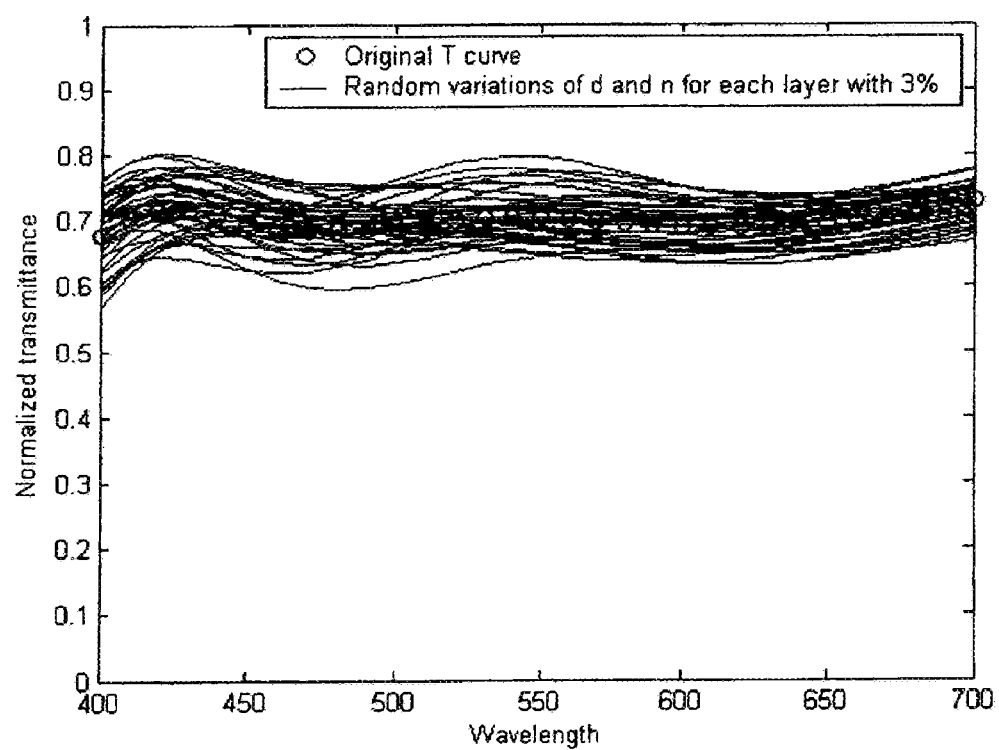
FIG. 16 shows the layer thickness and material refractive index tolerance analysis of the T=70% dielectric transflector in the first embodiment (FIG. 7a) with random variations for layer thickness and refractive index.

FIG. 12 shows the film thickness (d) tolerance. FIG. 13 shows the material refractive index and film thickness tolerance, where material refractive index and film thickness are randomly changed within ±3% of optimal values. FIGS. 14, 15, and 16 show the tolerance analysis for a T=70% multilayer transflector, in the first embodiment. FIG. 14 shows the material refractive (n) index tolerance. FIG. 15 shows the film thickness (d) tolerance. FIG. 16 shows the material refractive index and film thickness tolerance, where material refractive index (n) and film thickness (d) are randomly changed within ±3% of optimal values. From these figures, it is shown that the transmittance or reflectance of the multilayer dielectric films has a relatively large degree of manufacturing tolerance.

Next, the influence of the dielectric film on the voltage drop to the LC layer is analyzed. From Table 2, it is determined that a thinner dielectric film leads to a higher transmittance. For the worst scenario of T=30%, the maximum total film thickness is less than approximately 850 nm. When compared to the dielectric mirror (~1300 nm) used in a liquid crystal light valve, in which the resistance of dielectric mirror ($4.7 \times 10^{12} \Omega$) is only 1% of the resistance of LC ($6.1 \times 10^{14} \Omega$) [S. Fukushima, *Applied Optics*, Vol. 31, pp. 6859-6868 (1992)], the partially transmissive dielectric film of the present invention is only half the thickness of a regular dielectric mirror. Thus, the resistance is negligible and does not affect the voltage drop on the LC.

Actually, the transparent electrode can be coated above the dielectric transflector. FIG. 17 shows the structure of the second embodiment of a dielectric transflector 170 of the present invention. The multilayer dielectric transflector is composed of alternating high refractive index material titanium oxide ($TiO_2$) layers 172, 174, 176 and low refractive index material silicon dioxide ($SiO_2$) layers 182, 184, 186. This transflector is sandwiched between indium-tin-oxide (ITO) layer 181 and glass substrate 95, as shown in FIG. 17. A polyimide layer 171 is further coated above the ITO layer 181 to control the alignment direction of the liquid crystal layer 105. The vertical ellipsis 205 indicates that the number of alternating layers can be increased or decreased as needed or desired. Table 1 lists the refractive index and thickness of dielectric layers, ITO and PI. And since it is the product of thickness and refractive index value that counts for optical phase retardation, only the variations of index value are listed for the ITO and PI layers. The values shown are used to calculate the transflector's transmittance and reflectance by optimizing the film's thickness and the number of layers.

Figure 18:
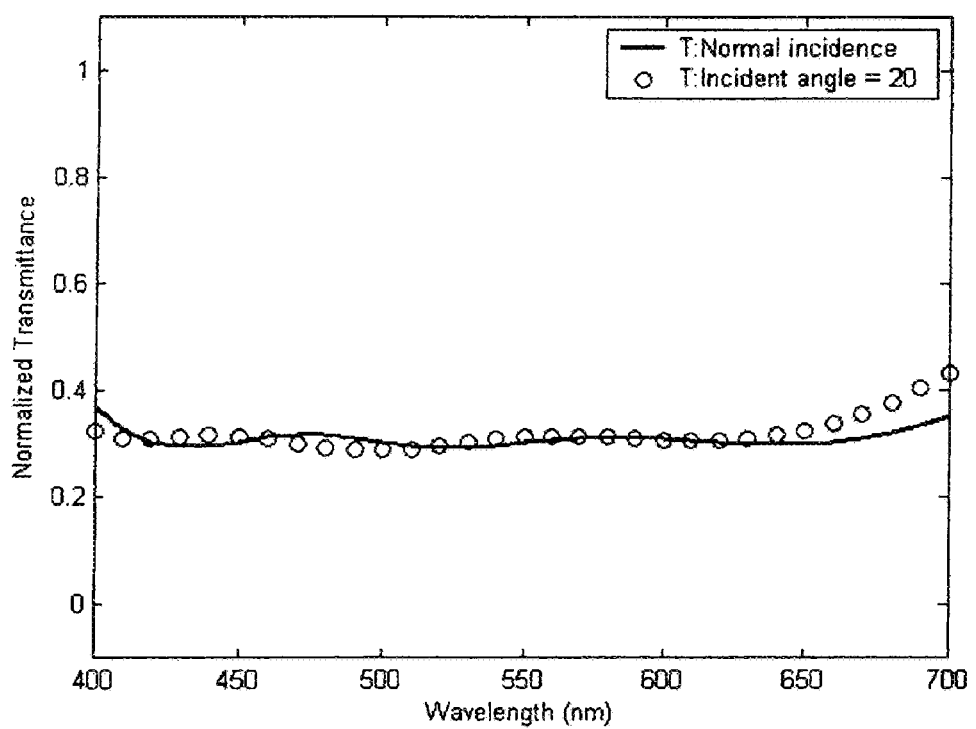
FIG. 18 shows the wavelength-dependent transmittance of T=30% dielectric films in the second embodiment (FIG. 17) at normal and 20° incident angles.
Figure 19:
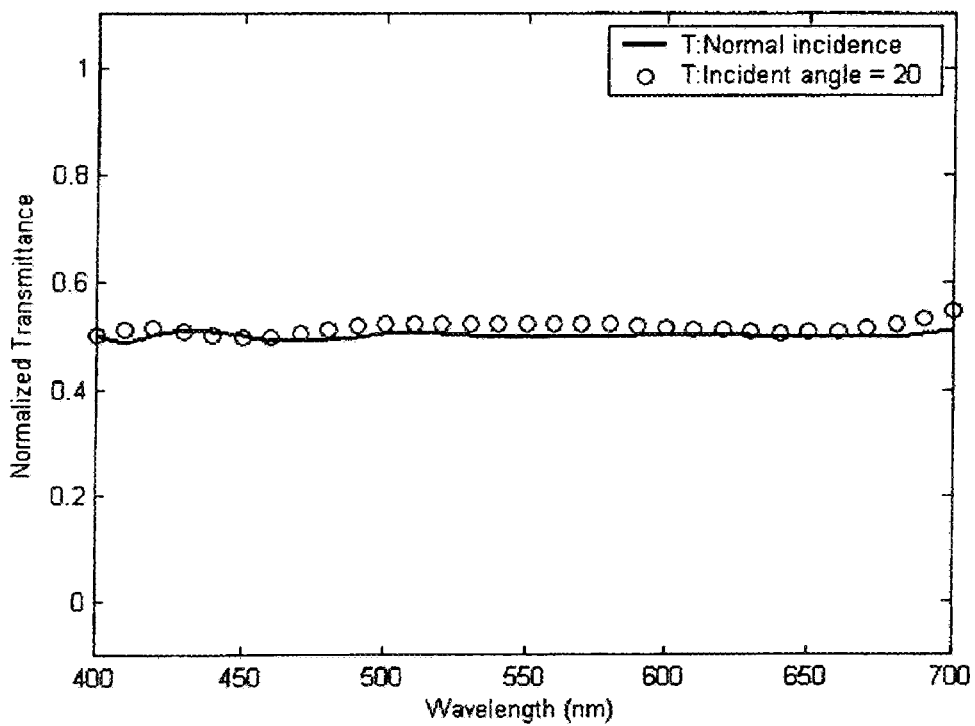
FIG. 19 shows the wavelength-dependent transmittance of T=50% dielectric films in the second embodiment (FIG. 17) at normal and 20° incident angles.
Figure 20:
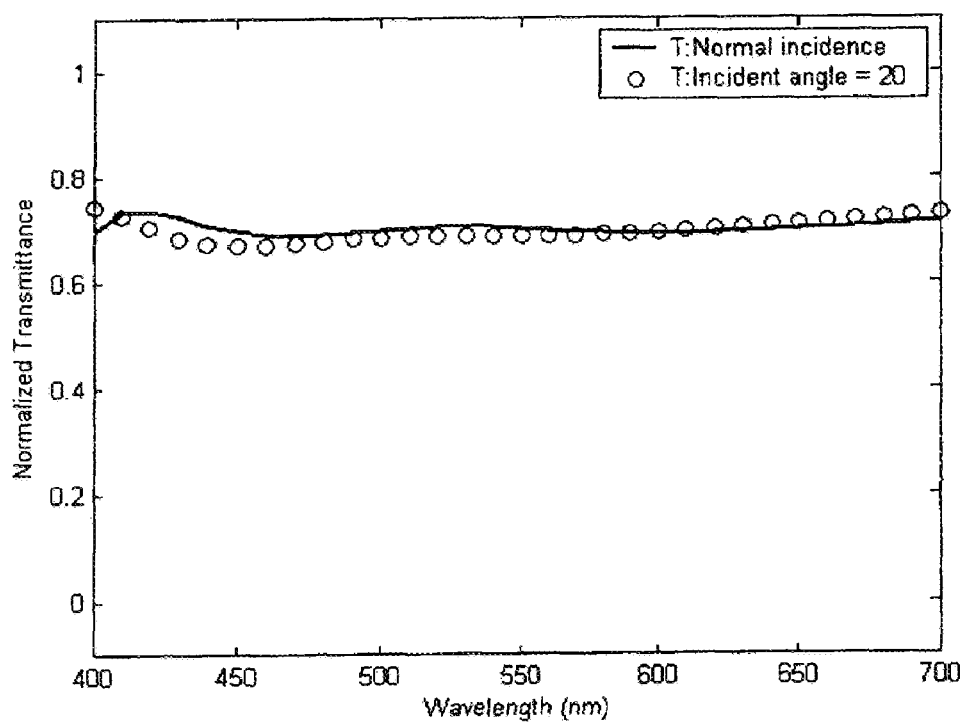
FIG. 20 shows the wavelength-dependent transmittance of T=70% dielectric films in the second embodiment (FIG. 17) at normal and 20° incident angles.

FIGS. 18, 19 and 20 show the wavelength dependent transmittance curves for three different transmittance multilayer dielectric transflectors in the second embodiment: T=30%, T=50% and T=70%. Again from these figures, it is evident that the transmittance is quite insensitive to the wavelength from approximately 400 nm to approximately 700 nm. In addition, the transmittance is also insensitive to the incident angles up to approximately 30° in the air and refractive angle of approximately 20° in the glass. The wavelength insensitivity property ensures high light efficiency in the whole visible light range and good color reproduction of image displayed from the panel. The wide acceptance angle of the multilayer transflector also benefits the image quality over a large viewing angle range. The optimal film thickness for $SiO_2$ and $TiO_2$ are listed in Table 3 below.

TABLE 3

Optimal Thickness of the $SiO_2$ (odd) and $TiO_2$ (even) Layers of 2nd Embodiment

| Layer number | Thickness (nm) | | |
|---|---|---|---|
| | Transmittance T = 30% | Transmittance T = 50% | Transmittance T = 70% |
| 1 | 75-85 | 82-92 | 55-65 |
| 2 | 30-40 | 16-26 | 14-24 |
| 3 | 35-45 | 60-70 | 65-75 |
| 4 | 45-55 | 40-50 | 44-54 |
| 5 | 80-90 | 55-65 | 140-150 |
| 6 | 50-60 | 76-86 | 65-75 |
| 7 | 90-100 | 83-93 | |
| 8 | 60-70 | 96-106 | |
| 9 | 125-135 | 18-28 | |
| 10 | 45-55 | 70-80 | |
| Number of layer | 10 | 10 | 6 |
| Total thickness(nm) | 635-735 | 596-696 | 383-443 |

Since the ITO layer is coated directly above the dielectric film in the second embodiment, the dielectric film does not cause any voltage drop on the liquid crystal layer.

Figure 21:
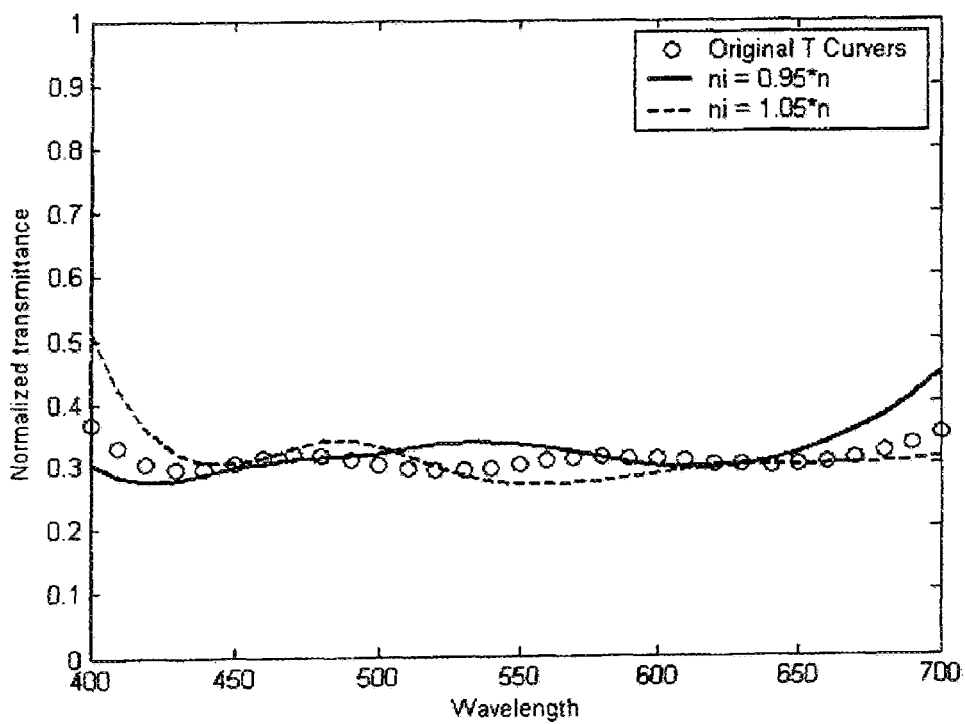
FIG. 21 shows the material refractive index tolerance analysis of the T=30% dielectric transflector in the second embodiment (FIG. 17).
Figure 22:
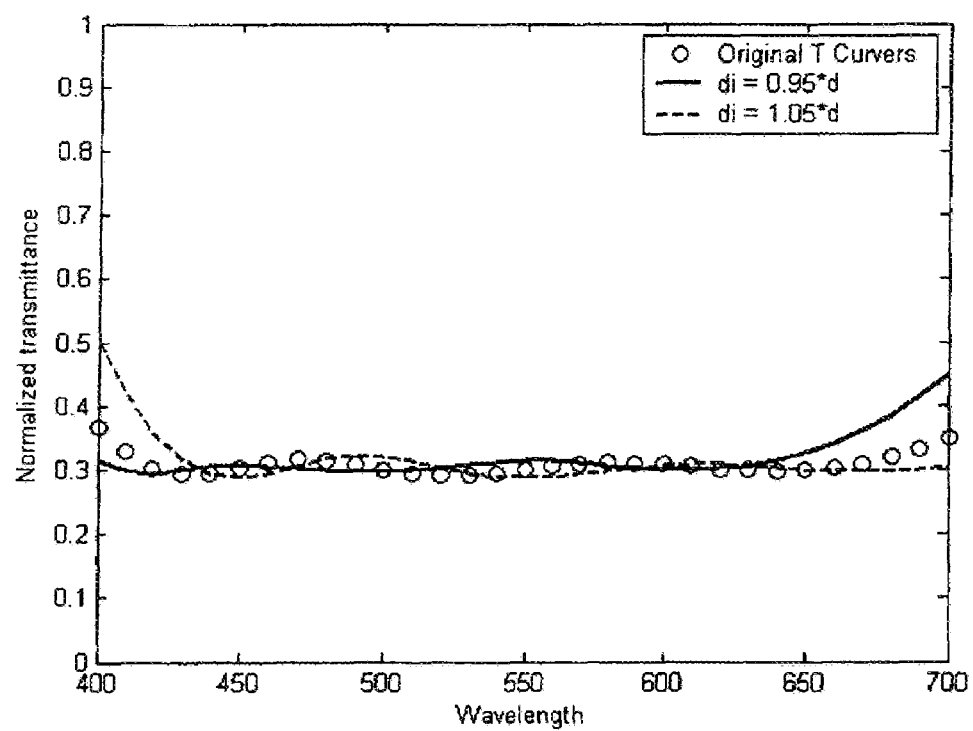
FIG. 22 shows the layer thickness tolerance analysis of the T=30% dielectric transflector in the second embodiment (FIG. 17).
Figure 23:
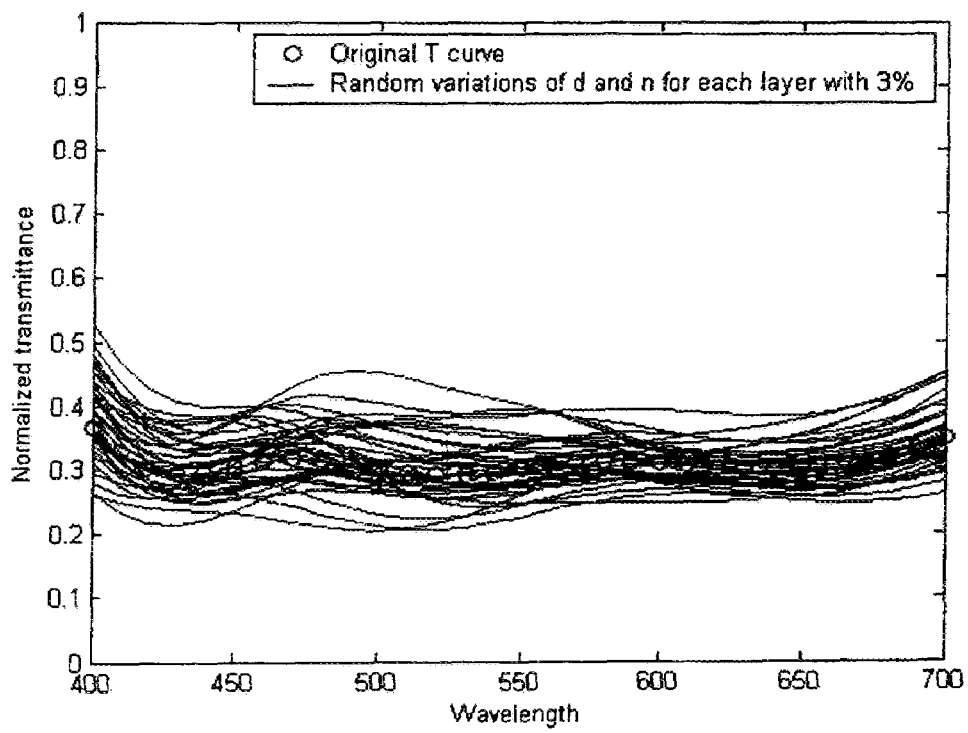
FIG. 23 shows the layer thickness and material refractive index tolerance analysis of the T=30% dielectric transflector in the second embodiment (FIG. 17), with random variations of layer thickness and refractive index.
Figure 24:
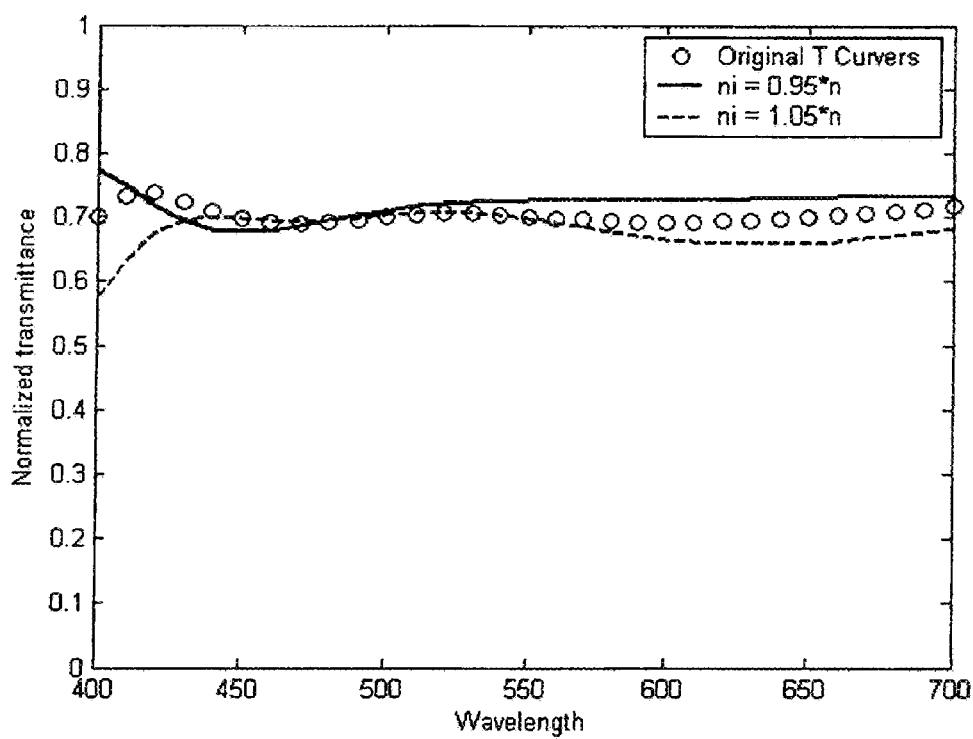
FIG. 24 shows the material refractive index tolerance analysis of the T=70% dielectric transflector in the second embodiment (FIG. 17).
Figure 25:
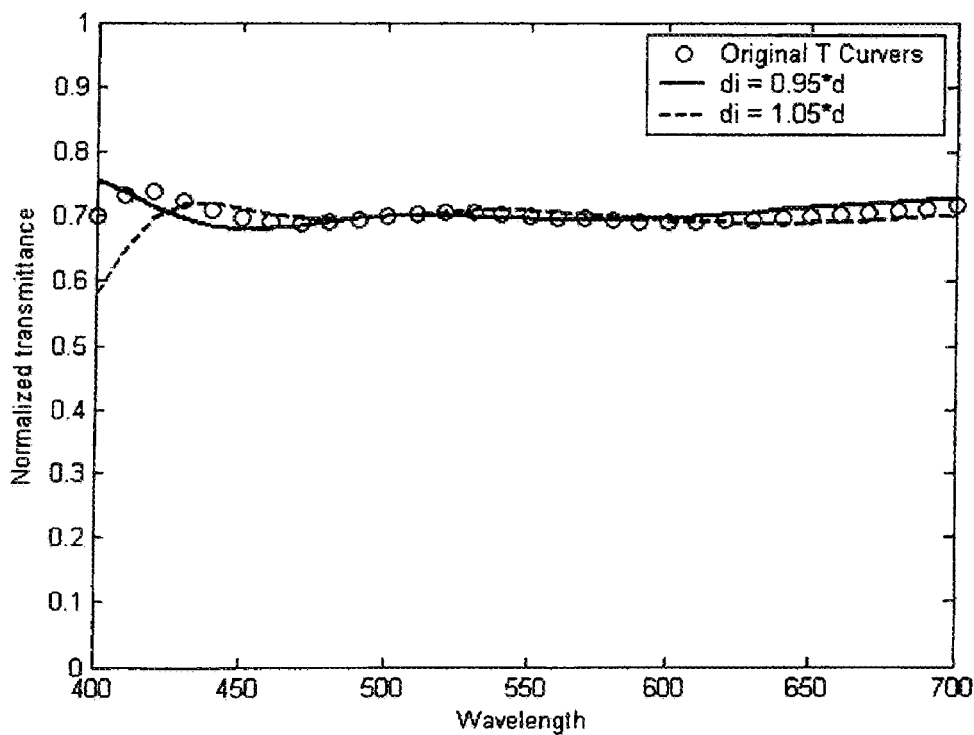
FIG. 25 shows the layer thickness tolerance analysis of the T=70% dielectric transflector in the second embodiment (FIG. 17).
Figure 26:
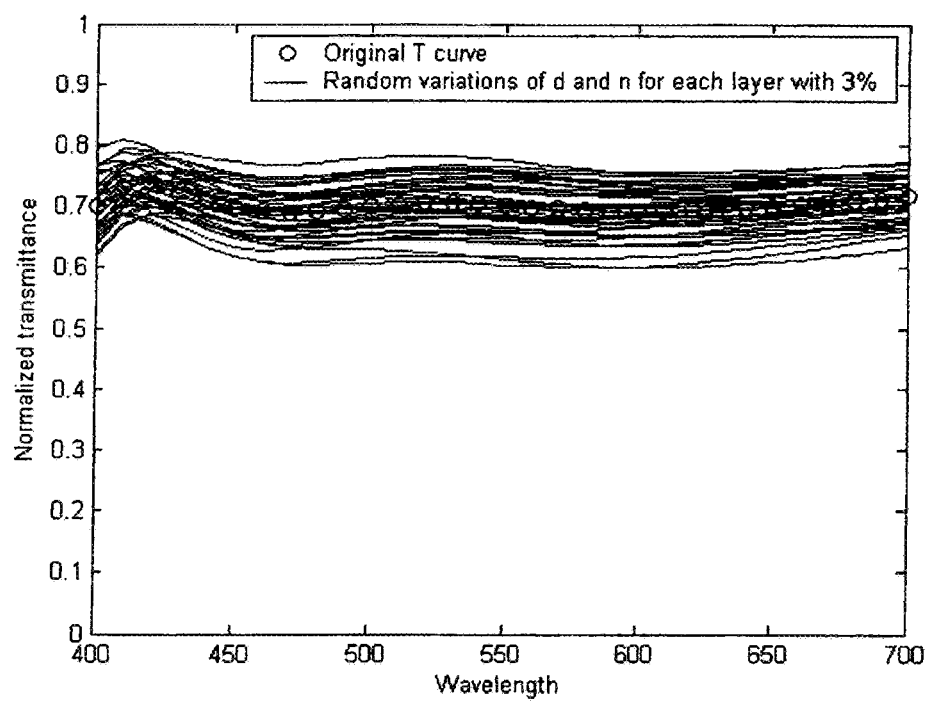
FIG. 26 shows the layer thickness and material refractive index tolerance analysis of the T=70% dielectric transflector in the second embodiment (FIG. 17) with random variations of layer thickness and refractive index.

Tolerance analysis for the dielectric transflector 170 in the second embodiment is shown in FIGS. 21-26. The same analysis procedure as described above in the first embodiment is used to determine the transmittance sensitivity to parameter variations. FIGS. 21-23 show the tolerance analysis for a T=30% multilayer transflector in the second embodiment. FIG. 21 shows the material refractive index (n) tolerance. FIG. 22 shows the film thickness (d) tolerance. FIG. 23 shows the material refractive index and film thickness tolerance, where material refractive index (n) and film thickness (d) are randomly changed within ±3% of optimal values. FIGS. 24, 25, and 26 show the tolerance analysis for a T=70% multilayer transflector, in the second embodiment. FIG. 24 shows the material refractive index (n) tolerance. FIG. 25 shows the film thickness (d) tolerance. FIG. 26 shows the material refractive index (n) and film thickness (d) tolerance, where material refractive index and film thickness are randomly changed within ±3% of optimal values. From these figures, it is shown again that the transmittance or reflectance of the multilayer dielectric films has a relatively large degree of manufacturing tolerance.

Several outstanding features of the transflective LCD of the present invention are summarized below.

The multilayer dielectric film is a robust dielectric transflector because it is insensitive to light from incident angles. Its transmittance can vary from approximately 5% to approximately 95% by controlling the dielectric film thickness and selecting the materials with proper refractive index. In comparison to the prior art use of metallic films, such as silver and aluminum, the dielectric film is robust as a result of overcoating a polyimide alignment layer. Moreover, it does not shield the applied voltage.

Further, the dielectric transflector is parallax-free because the transflector is deposited in the inner side of the bottom LCD substrate. As a result of this arrangement, no parallax occurs.

In the present invention, the simpler structure of a single cell gap is used. The same pixel works for both reflective (R) and transmissive (T) displays. The response time for the R and T modes is the same. The fabrication process is simple.

Figures 27A, 27B, 27C:
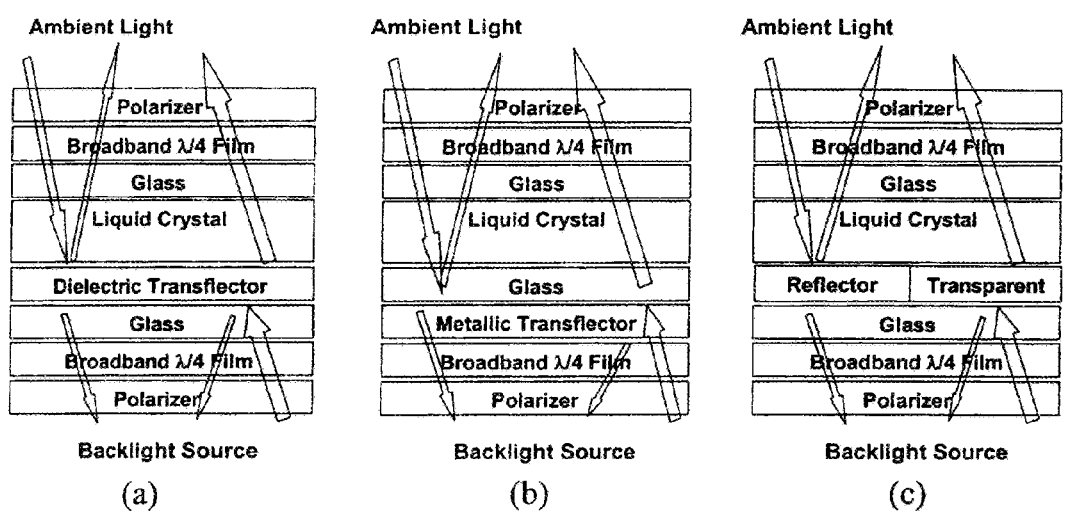
FIG. 27a shows the structure of the transflective LCD of the present invention.
FIG. 27b shows the structure of a prior art transflective LCD using one metallic transflector layer.
FIG. 27c shows the structure of a prior art, single cell gap type transflective LCD using a split-pixel approach.

FIG. 27 provides a comparison of the structure and operating principle of the transflective LCD of the present invention and two prior art transflective LCDs. FIG. 27a represents the present invention; FIG. 27b shows a transflective LCD using a metallic film; FIG. 27c shows the single cell gap type transflective LCD using split-pixel approach. The top and bottom polarizers are crossed. The LC mode, for example, the vertical alignment (VA) mode as described by M. F. Schiekel and K. Fahrenschon, *Appl. Phys. Lett.* 19, 391 (1971), can be used for both reflective and transmissive displays. All three approaches shown in FIGS. 27a, 27b and 27c have about the same reflectance and transmittance. However, the transflective LCD of the present invention has no measurable parallax.

From the above description, the novel transflective LCD of the present invention has a simple fabrication process. In comparison to the split-pixel approach, this invention does not need to divide R and T sub-pixels; therefore, a high performance and low cost transflective LCD is provided.

Additional outstanding features of the transflective LCD of the present invention include, but are not limited to, having a dielectric transflector with variable transmittance from approximately 5% to approximately 95%, a spectral bandwidth that covers approximately 400 nanometers (nm) to approximately 700 nm, a transmittance of the dielectric transflector that is insensitive to the light incident angle and a dielectric transflector that is so thin that the applied voltage will not be shielded across the LC layer.

The large variable transmittance is such that for transflective LCDs primarily for outdoor use, a low transmittance dielectric transflector can save power; on the other hand, if the transflective LCD is primarily for indoor use, it is preferable to have a large transmittance dielectric transflector, which allows more light from the backlight source to pass through the dielectric transflector.

The wide spectral bandwidth from approximately 400 nanometers (nm) to approximately 700 nm permits the whole visible light range to pass through or be reflected by the transflector.

When the transmittance of the dielectric transflector is insensitive to the light incident angle, as in the present invention, the insensitivity feature ensures a good image quality over a wide viewing range.

A thin dielectric transflector, such as the transflector in the present invention, does not shield voltage across the LC layer, so there will not be a significant voltage drop along the layer which results in a high driving voltage of the LC cell.

Thus, the multilayer dielectric film is a robust dielectric transflector because of the many outstanding features discussed above. The transmittance can vary from approximately 5% to approximately 95% by controlling the dielectric film thickness and selecting the materials with proper refractive index. In comparison to the prior art use of metallic films, such as silver and aluminum, the dielectric film is also more robust as a result of over-coating a polyimide alignment layer. Moreover, it does not shield the applied voltage.

Further, the dielectric transflector is parallax-free because the transflector is deposited in the inner side of the bottom LCD substrate. As a result of this arrangement, no parallax occurs.

In the present invention, the simpler structure of a single cell gap is used. The same pixel works for both reflective (R) and transmissive (T) displays. The response time for the R and T modes is the same. The fabrication process is simple.

FIG. 27 provides a comparison of the structure and operating principle of the transflective LCD of the present invention and two prior art transflective LCDs. FIG. 27a represents the present invention; FIG. 27b shows a transflective LCD using a metallic film; FIG. 27c shows the transflective LCD using a single cell gap approach. The top and bottom polar-izers are crossed. The LC mode, for example, the vertical alignment (VA) mode can be used for both reflective and transmissive displays. All three approaches shown in FIGS. 27a, 27b and 27c have about the same reflectance and transmittance. However, the transflective LCD of the present invention (FIG. 27a) has no measurable parallax.

From the above description, the simple fabrication process of the novel transflective LCD of the present invention is evident. The sandwich-like structure comprises a top polarizer layer 16 and a bottom polarizer layer 18 wherein each polarizer layer is adjacent to broadband quarter wave films which are combinations of half-wave films 20, 24 and quarter wave films 22, 26. Positioned between the upper and lower broadband quarter-wave films are an upper transparent substrate 2 and a lower transparent substrate 4 which sandwich a liquid crystal layer 14 that is positioned above the multilayer dielectric transflector 6. In comparison to the split-pixel approach, the present invention does not need to divide R and T sub-pixels therefore, a high performance and low cost transflective LCD is provided. In comparison to the metallic transflector approach, the position of the dielectric transflector of the present invention eliminates the problem of parallax.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A parallax-free transflective liquid crystal display (LCD) device comprising,
   a top linear polarizer layer and a bottom linear polarizer layer,
   a first transparent substrate coated with transparent indium-tin-oxide (ITO) electrode and alignment film on an inner surface of the transparent substrate;
   a second transparent substrate;
   a first half-wave retardation film and a first quarter-wave retardation film sandwiched between the top linear polarizer and the first transparent substrate;
   a second half-wave retardation film and a second quarter-wave retardation film sandwiched between the bottom linear polarizer and the second transparent substrate;
   a liquid crystal layer positioned above a multilayer dielectric transflector layer sandwiched between the first transparent substrate coated with ITO and the second transparent substrate, wherein the multilayer dielectric transflector layer further comprises alternating layers of a high refractive index material and a low refractive index material positioned between the second transparent substrate and a layer of indium-tin-oxide;
   a voltage source; and
   a backlight source positioned below the bottom linear polarizer layer that passes light through the liquid crystal layer and further through the top linear polarizer while incident ambient light passes through the top linear polarizer into the liquid crystal layer and a portion of the incident ambient light is reflected backward from the liquid crystal through the top linear polarizer, such that during operation of the LCD there is no parallax.

2. The transflective LCD device of claim 1, further including a color filter layer positioned above the liquid crystal layer.

3. The transflective LCD device of claim 2 wherein the transmittance of the dielectric transflector is between approximately 5% and approximately 95%.

4. The transflective LCD device of claim 1, wherein the liquid crystal is a vertical alignment mode cell.

5. The transflective LCD device of claim 1, wherein the first and second transparent substrates are selected from at least one of glass or plastic.

6. The transflective LCD device of claim 1 wherein the high refractive index material is titanium dioxide and the low refractive index material is silicon dioxide in the dielectric film transflector.

7. The transflective LCD device of claim 6 wherein the dielectric film transflector has alternating layers of titanium dioxide and silicon dioxide.

8. The transflective LCD device of claim 1 wherein the dielectric film transflector having approximately 10 layers of films is approximately 700 nanometers (nm) in thickness.

9. The transflective LCD device of claim 1, wherein the multilayer dielectric transflector permits from approximately 5% to approximately 95% of backlight into the liquid crystal layer.

10. The transflective LCD device of claim 1, wherein the multilayer dielectric transflector reflects from approximately 5% to approximately 95% of incident ambient light backward to the liquid crystal layer.

11. A method for making a high performance, low cost, parallax-free transflective liquid crystal display device comprising the steps of:
a) placing a liquid crystal (LC) layer above a multilayer dielectric film transflector, the multilayer dielectric transflector further comprises alternating layers of a high refractive index material and a low refractive index material positioned between a lower transparent substrate and a layer of indium-tin-oxide layer:
b) sandwiching the LC layer and dielectric transflector between an upper transparent substrate and the lower transparent substrate;
c) placing the upper and lower transparent substrates sandwiching the LC layer and dielectric transflector between a top polarizer layer and a bottom polarizer layer;
d) positioning the bottom polarizer layer above a backlight source; and
e) applying voltage to the liquid crystal layer.

12. The method of claim 11 further including the steps of:
a) placing the upper and lower transparent substrates sandwiching the LC layer and the multilayer dielectric transflector between an upper layer of a half-wave film and quarter-wave film and a lower layer of a half-wave film and quarter wave film, and
b) placing the upper and lower layers of a half-wave film and a quarter wave film between a top polarizer layer and a bottom polarizer layer.

13. The method of claim 11, wherein the liquid crystal is a vertical alignment mode cell.

14. The method of claim 11 wherein the high refractive index material is titanium dioxide and the low refractive index material is silicon dioxide in the dielectric transflector.

15. The method of claim 11, wherein the transparent substrates are selected from at least one of glass or plastic.

16. The method of claim 11, wherein the transmittance of the dielectric transflector is between approximately 5% and approximately 95%.

17. The method of claim 11, wherein the dielectric transflector has approximately 10 layers of films that are approximately 700 nanometers (nm) in thickness.

18. The method of claim 11, wherein the transflective liquid crystal display (LCD) device comprises a multilayer dielectric transflector that permits from approximately 5% to approximately 95% of backlight into the liquid crystal layer.

19. The method of claim 11, wherein the transflective LCD device has a multilayer dielectric transflector that reflects from approximately 5% to approximately 95% of incident ambient light backward to the liquid crystal layer.

* * * * *